US012209509B2

(12) United States Patent
Hanschke

(10) Patent No.: US 12,209,509 B2
(45) Date of Patent: Jan. 28, 2025

(54) BLADE FOR A TURBOMACHINE, AND TURBOMACHINE HAVING AT LEAST ONE BLADE

(71) Applicant: MTU Aero Engines AG, Munich (DE)

(72) Inventor: Benjamin Hanschke, Munich (DE)

(73) Assignee: MTU AERO ENGINES AG, Munich (DE)

( * ) Notice: Subject to any disclaimer, the term of this patent is extended or adjusted under 35 U.S.C. 154(b) by 0 days.

(21) Appl. No.: 18/057,265

(22) Filed: Nov. 21, 2022

(65) Prior Publication Data

US 2023/0160306 A1 May 25, 2023

(30) Foreign Application Priority Data

Nov. 22, 2021 (DE) ......................... 102021130522.5

(51) Int. Cl.
*F01D 5/14* (2006.01)

(52) U.S. Cl.
CPC ........ *F01D 5/141* (2013.01); *F05D 2220/323* (2013.01); *F05D 2240/30* (2013.01)

(58) Field of Classification Search
CPC ............................. F01D 5/141; F05D 2240/30
See application file for complete search history.

(56) References Cited

U.S. PATENT DOCUMENTS 4,585,395 A * 4/1986 Nourse ................... F01D 5/141 415/181
4,589,175 A * 5/1986 Arrigoni ................. B23P 6/002 451/365
4,682,935 A * 7/1987 Martin .................... F01D 5/141 415/181
6,299,412 B1 * 10/2001 Wood .................... F04D 29/384 416/223 A
10,443,390 B2 * 10/2019 Duong .................. F04D 29/324
(Continued)

FOREIGN PATENT DOCUMENTS

DE 102014226689 A1 6/2016
DE 102015224151 A1 6/2017
(Continued)

OTHER PUBLICATIONS

Eric A. Dow et al, "The Implications of Tolerance Optimization on Compressor Blade Design," Journal of Turbomachinery, Oct. 2015, pp. 1-10, American Society of Mechanical Engineers, New York City,NY, U.S.

(Continued)

*Primary Examiner* — Brian Christopher Delrue
(74) *Attorney, Agent, or Firm* — LEYDIG, VOIT & MAYER, LTD.

(57) ABSTRACT

A blade has an internal blade profile, and a jet deflection portion adjoining the internal blade profile. Each blade profile of the jet deflection portion has a center of gravity. The centers of gravity are joined by a thread line, which is a space line, starting from the internal blade profile. A total deviation of the space line in relation to the reference line is described by an nth order polynomial based on radial distance from the blade profile to a reference point. The thread line is selected and designed such that a compressive stress is produced in the region of the leading edge of the blade during operation.

5 Claims, 4 Drawing Sheets

(56) References Cited

U.S. PATENT DOCUMENTS

| | | | | |
|---|---|---|---|---|
| 2003/0035723 A1* | 2/2003 | Decker | F04D 29/544 | 415/211.2 |
| 2003/0215330 A1* | 11/2003 | Haller | F01D 25/30 | 415/191 |
| 2005/0031454 A1* | 2/2005 | Doloresco | F01D 5/141 | 416/238 |
| 2005/0254956 A1* | 11/2005 | Dutton | F04D 29/681 | 416/243 |
| 2008/0152501 A1* | 6/2008 | Greim | F01D 5/141 | 416/223 A |
| 2010/0150729 A1* | 6/2010 | Kirchner | F01D 5/12 | 416/223 R |
| 2015/0017012 A1* | 1/2015 | Pouzadoux | F04D 29/324 | 416/225 |
| 2017/0159461 A1 | 6/2017 | Schoenhoff et al. | | |
| 2020/0182730 A1* | 6/2020 | Pickens | G01M 1/10 | |

FOREIGN PATENT DOCUMENTS

| | | | |
|---|---|---|---|
| EP | 1106835 A2 * | 6/2001 | F01D 5/141 |
| EP | 2551657 B1 | 8/2017 | |
| WO | WO 2013114030 A1 | 8/2013 | |
| WO | WO 2015175051 A2 | 11/2015 | |

OTHER PUBLICATIONS

Dow, Eric Alexander, "Robust design and tolerancing of compressor blades," Thesis: Ph. D., Massachusetts Institute of Technology, Department of Aeronautics and Astronautics, 2015. Mar. 2015, pp. 1-152, Massachusetts Institute of Technology, Cambridge, MA, United States.

E.M. Fagan et al, "Validation of the multi-objective structural optimisation of a composite wind turbine blade," Composite Structures, Nov. 15, 2018, pp. 567-577, Elsevier, Amsterdam, Netherlands.

Kumar, Apurva, "Robust design methodologies: application to compressor blades," Doctoral Thesis, Nov. 2006, pp. 1-171, University of Southampton, School of Engineering Sciences, Southampton, UK.

Rodriguez-Fernandez, Pablo, "Development of Shape-Optimization Tools for the Aerodynamic Design of Turbomachinery Blades," Mar. 2015, pp. 1-140, E.T.S.I. Industriales (UPM), Madrid, Spain.

Sivashanmugam, Vadivel Kumaran, "Three dimensional Aero-Structural Shape Optimization of Turbomachinery Blades," Master thesis, Jan. 2011, pp. 1-135, Concordia University Montreal, Quebec, Canada.

Ulf D. Köller et al, "Konstruktion, Berechnung und Fertigung von Verdichterschaufeln," Stationäre Gasturbinen, 2003, pp. 539-556, Springer Link, Berlin, Germany.

Marc G. Nagel, "Numerische Optimierung dreidimensional parametrisierter Turbinenschaufeln mit umfangsunsymmetrischen Plattformen—Entwicklung, Anwendung und Validierung," Sep. 2009, pp. 1-130, Universität der Bundeswehr München. Munich, Germany.

Christof Lechner et al, "Stationäre Gasturbinen," 2010, pp. 557-559, Capital 14.2.1, Springer Link, Berlin, Germany.

* cited by examiner

BLADE FOR A TURBOMACHINE, AND TURBOMACHINE HAVING AT LEAST ONE BLADE

CROSS REFERENCE TO RELATED APPLICATIONS

This application claims benefit to German Patent Application No. DE 102021130522.5, filed on Nov. 22, 2021, which is hereby incorporated by reference herein.

FIELD

The present disclosure relates to a blade for a turbomachine, in particular for an aircraft engine, and to a turbomachine.

BACKGROUND

Blades for compressors are predominantly optimized for maximum efficiency and for maintaining a corresponding surge margin while taking account of the structural and mechanical strength requirements.

One drawback of the blades optimized in this way is that they are prone to damage caused by foreign objects that are sucked into the turbomachine and strike the blades. These strikes may cause damage in particular to the leading blade edges of the blades. The risk of foreign objects being sucked in is particularly high during the take-off and landing phases of an aircraft, due to birds or objects on the runway. When damaged, the regions restrict the further operation of the engine and make it necessary to carry out extraordinary maintenance on the affected components.

When designing blades, it is commonplace to generate two-dimensional profiles that are optimized for a flow pattern. The profiles are located in a lateral area of a cylinder coordinate system based on a turbomachine. To generate a three-dimensional blade structure, it is commonplace to stack the individual profiles in a normal orientation in relation to a reference line. In this case, the reference line runs substantially radially starting from a rotor shaft. The reference line runs through respective characteristic points on each profile, for example the respective centers of gravity. In this context, common practice is to join the centers of gravity of the individual profiles using a thread line which has a linear course in the radial direction.

To optimize certain properties, common practice is to adjust the thread line course such that the course of the thread line deviates from that of the linear reference line. In the process, the profiles are displaced such that the centers of gravity are no longer located on the radially and linearly running reference line. Displacing the centers of gravity changes the distributions of stresses in the blades under operating conditions.

By way of example, the following documents disclose optimizing blades for turbomachines.

The Master's thesis "Development of Shape-Optimization Tools for the Aerodynamic Design of Turbomachinery Blades," submitted in 2015 by Pablo Rodriguez Fernández at the Universidad Politécnica de Madrid, discloses developing shape-optimization tools for the aerodynamic design of turbomachine blades. This document describes how a blade geometry is to be defined using parameterization techniques on the basis of B-spline curves, which allow a shape of the blade to be fixed locally.

The publication Dow, E. A., & Wang, Q. (2015), "The implications of tolerance optimization on compressor blade design," Journal of Turbomachinery, 137(10), 101008 describes the implications of tolerance optimization on compressor blade design. The publication deals with the effects that the geometric variability of blades has on blade performance. The geometric variability increases the power variability and impairs the average power of compressor blades for turbomachines. These adverse effects may be lessened by robustly optimizing the blade geometry or by stricter manufacturing specifications. The publication describes the flow separation at the leading edge, which occurs in some blades when the radius of curvature of the leading edge is reduced beyond a critical value, resulting in the blade losses drastically increasing. The optimal leading-edge geometry is thus dependent on the level of manufacturing tolerances, thus illustrating the potential interplay between geometry optimization and tolerance optimization.

The dissertation "Three dimensional aero-structural shape optimization of turbomachinery blades," submitted in 2011 by Sivashanmugam, V. K. at Concordia University, describes the development and implementation of a module for structural shape optimization and the integration thereof with a module for aerodynamic shape optimization to form an automated aero-structural optimization method.

The dissertation "Robust design and tolerancing of compressor blades," submitted in 2015 by Dow, E. A. at the Massachusetts Institute of Technology, concerns the robust design of compressor blades.

The dissertation "Robust design methodologies: Application to compressor blades," submitted in 2006 by Kumar, A. at the University of Southampton, concerns the application of robust design methodologies to compressor blades. The dissertation discloses determining compressor blade geometries that make a robust contribution even when the geometry deviates from a predetermined shape.

The publication Fagan, E. M., De La Torre, O., Leen, S. B., & Goggins, J. (2018), "Validation of the multi-objective structural optimisation of a composite wind turbine blade. Composite structures," 204, 567-5t, relates to validation of the multi-objective structural optimization of a wind turbine blade. In the publication, structural features of the blade, such as mass and center of gravity, and results from static and modal tests are used to validate predictions from finite-element methods for custom-designed blades.

The chapter Köller U., Van den Toorn B. (2010) "*Konstruktion, Berechnung and Fertigung von Verdichterschaufeln*" [Design, calculation, and production of compressor blades] in Lechner C., Seume J. (eds) "*Stationäry Strömungsmaschinen*" [Stationary turbomachines], VDI-Buch. Springer, Berlin, Heidelberg, discloses the finishing of blade profiles of a rotor blade.

SUMMARY

In an embodiment, the present disclosure provides a blade for a turbomachine that has an internal blade profile; and a jet deflection portion, which adjoins the internal blade profile in a radial direction in relation to a rotor shaft. Each blade profile of the jet deflection portion, which are in a normal orientation in relation to the radial direction, has a respective center of gravity. The centers of gravity are displaced in parallel with the rotor shaft in an axial direction by respective axial variation values in relation to a reference line running linearly in the radial direction, and/or the centers of gravity are displaced in a tangential direction by respective tangential variation values in relation to the reference line. The respective centers of gravity are joined by a thread line starting from the internal blade profile. The thread line is a space line. A total deviation of the space line in the blade profiles in relation to the reference line is described by a polynomial of the nth order on the basis of a respective radial distance from the relevant blade profile to a reference point, where n is a natural number greater than 1. The thread line is selected and designed such that a compressive stress is produced in the region of the leading edge of the blade during operation.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
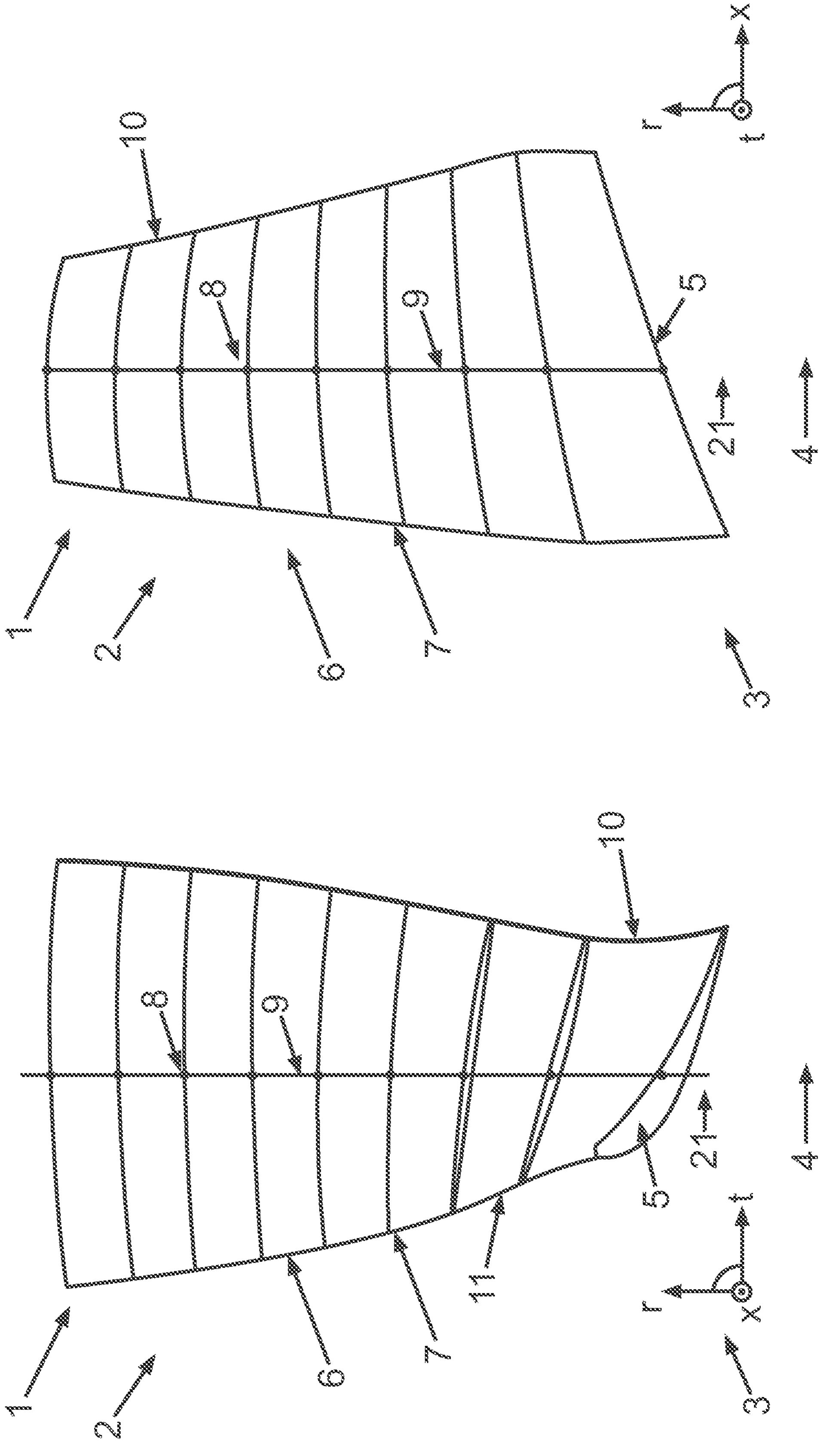
FIG. 1 is a schematic illustration of a course of a reference line in a blade.

Aspects of the present disclosure provide a blade that is less prone to foreign object damage than blades according to the prior art.

Advantageous embodiments of each aspect of the present disclosure should also be considered to be advantageous embodiments of the other aspects of the present disclosure.

A first aspect of the present disclosure relates to a blade for a turbomachine. The blade has an internal blade profile, which may abut a rotor element, and an airfoil portion, which adjoins the internal blade profile in a radial direction in relation to a rotor shaft. The internal blade profile may, for example, be a profile of a hub or of a blade root element, or be a first profile of the airfoil portion that the airfoil portion of the blade adjoins in a radially outer direction. The coordinates of the turbomachine may be defined in relation to the rotor shaft of the turbomachine; the axial direction may run in parallel with a longitudinal direction of the rotor shaft. The blade may also be arranged on a disk of a blisk. A radial direction may run perpendicularly starting from the rotor shaft. A tangential direction may run in a circumferential direction around the rotor shaft. The airfoil portion may be arranged on the internal blade profile remotely from the rotor shaft in the radial direction. The airfoil portion may comprise a jet deflection portion of the blades. Each blade profile of the airfoil portion, each of which is in a normal orientation in relation to the radial direction, may have a respective center of gravity. In other words, in the airfoil portion the blades have as cross sections blade profiles that are oriented perpendicularly to the radial direction. Each of the blade profiles has its own center of gravity. The centers of gravity are displaced in parallel with the rotor shaft in an axial direction by respective axial variation values in relation to a reference line running linearly in the radial direction. Additionally or alternatively, the centers of gravity are displaced in a tangential direction by respective tangential variation values in relation to the reference line. In other words, the center of gravity of each blade profile is displaced in the axial direction and/or in the tangential direction by the respective axial variation values or the respective tangential variation values, respectively, in relation to the reference line. The displacements of each center of gravity in the axial direction are described by the respective axial variation values, which are defined in relation to the reference line running linearly in the radial direction. The displacements of each center of gravity in the tangential direction are described by respective tangential variation values, which are defined in relation to the reference line running linearly in the radial direction. The respective centers of gravity of each blade profile are joined by a thread line starting from the internal blade profile. In other words, the center of gravity of each blade profile is arranged on the thread line running from the internal blade profile. By way of example, the thread line may run from a center of gravity of the internal blade profile.

According to an aspect of the present disclosure, the thread line is a space line, a total deviation of the space line in the blade profiles in relation to the reference line being described by a polynomial of the nth order, where n>1, on the basis of a respective radial distance of the relevant blade profile from the internal blade profile. In this case, n is a natural number. In other words, the thread line describes a course of the positions of the centers of gravity of the blade profiles on the basis of the radial distance of the blade profiles from the internal blade profile. The thread line describes the position of each center of gravity on the basis of the radial distance from the centers of gravity to an origin, which may be a center of gravity of a blade profile (the internal blade profile). In this case, the thread line is defined by a polynomial of the order n, which has a degree greater than 1. According to an aspect of the present disclosure, the thread line is arranged such as to achieve a configuration that brings about a compressive stress at a leading edge of the blade under operating conditions. In other words, owing to the aforementioned course of the thread line, a negative stress can be provided at the leading edge of the blade during operation. This results in the advantage whereby cracks cannot propagate in the leading edge because compressive stresses counteract the propagation of cracks. The blade region that is primarily at risk from foreign object damage (FOD) is thus less prone to damage than is the case for blades according to the prior art.

Aspects of the present disclosure also encompass developments that result in further advantages.

According to one embodiment of the present disclosure, at least one maximum of the polynomial form of the thread line may be offset axially rearward, i.e., downstream, relative to a reference line oriented purely radially. Preferably, all the maxima of the thread line may be offset radially rearward in relation to the reference line.

In a development of the present disclosure, the respective tangential variation values are in a range between −5° and +5°. In other words, the center of gravity of each blade profile deviates from the reference line by between −5° and 5°. The deviation may thus be in a range from −5° to +5°. In other words, the tangential deviation between the centers of gravity and the reference line may be −5.0°, −4.9°, −4.8°, −4.7°, −4.6°, −4.5°, −4.4°, −4.3°, −4.2°, −4.1°, −4.0°, −3.9°, −3.8°, −3.7°, −3.6°, −3.5°, −3.4°, −3.3°, −3.2°, −3.1°, −3.0°, −2.9°, −2.8°, −2.7°, −2.6°, −2.5°, −2.4°, −2.3°, −2.2°, −2.1°, −2.0°, −1.9°, −1.8°, −1.7°, −1.6°, −1.5°, −1.4°, −1.3°, −1.2°, −1.1°, −1.0°, −0.9°, −0.8°, −0.7°, −0.6°, −0.5°, −0.4°, −0.3°, −0.2°, −0.1°, 0°, 0.1°, 0.2°, 0.3°, 0.4°, 0.5°, 0.6°, 0.7°, 0.8°, 0.9°, 1.0°, 1.1°, 1.2°, 1.3°, 1.4°, 1.5°, 1.6°, 1.7°, 1.8°, 1.9°, 2.0°, 2.1°, 2.2°, 2.3°, 2.4°, 2.5°, 2.6°, 2.7°, 2.8°, 2.9°, 3.0°, 3.1°, 3.2°, 3.3°, 3.4°, 3.5°, 3.6°, 3.7°, 3.8°, 3.9°, 4.0°, 41°, 42°, 4.3°, 4.4°, 4.5°, 4.6°, 4.7°, 4.8°, 4.9°, or 5.0°.

In a development of the present disclosure, the respective tangential variation values are in a range between −2.5° and 2.5°. In other words, the center of gravity of each blade profile deviates from the reference line by a range from −2.5° to 2.5°. The deviation may thus be in a range from −2.5° to +2.5°. In other words, the tangential deviation between the centers of gravity and the reference line may be −2.5°, −2.4°, −2.3°, −2.2°, −2.1°, −2.0°, −1.9°, −1.8°, −1.7°, −1.6°, −1.5°, −1.4°, −1.3°, −1.2°, −1.1°, −1.0°, −0.9°, −0.8°, −0.7°, −0.6°, −0.5°, −0.4°, −0.3°, −0.2°, −0.1°, 0°, 0.1°, 0.2°, 0.3°, 0.4°, 0.5°, 0.6°, 0.7°, 0.8°, 0.9°, 1.0°, 1.1°, 1.2°, 1.3°, 1.4°, 1.5°, 1.6°, 1.7°, 1.8°, 1.9°, 2.0°, 2.1°, 2.2°, 2.3°, 2.4°, or 2.5°.

In a development of the present disclosure, the respective axial variation values are in a range between 0 and 20% of a respective chord length of each blade profile. In other words, a maximum deviation in the axial direction is at most 20% of the respective chord length of each blade profile, the chord length joining a leading edge to a trailing edge of the profile in question. The axial variation values may, for example, be 0%, 1%, 2%, 3%, 4%, 5%, 6%, 7%, 8%, 9%, 10%, 11%, 12%, 13%, 14%, 15%, 16%, 17%, 18%, 19%, or 20% of the respective chord length of each blade profile.

In a development of the present disclosure, the respective axial variation values are in a range between 0 and 10% of a respective chord length of each blade profile. In other words, a maximum deviation in the axial direction is at most 10% of the respective chord length of each blade profile, the chord length joining a leading edge to a trailing edge of the profile in question. The axial variation values may, for example, be 0%, 1%, 2%, 3%, 4%, 5%, 6%, 7%, 8%, 9%, or 10% of the respective chord length of each blade profile.

In a development of the present disclosure, the blade is formed as a rotor blade. In other words, the blade is a rotor blade provided for transmitting energy between the turbomachine and a fluid. Accordingly, the blade may be intended to be arranged on a rotor that rotates about its longitudinal direction during operation, stresses being induced in the blade as a result.

In a development of the present disclosure, respective stacking angles of at least some of the blade profiles of each rotor blade deviate from a nominal stacking angle of an internal blade profile by respective stacking angle variation values, the respective stacking angle variation values being at most 2°. In other words, the respective stacking angles differ from the nominal stacking angle by at most 2°. The stacking angle variation values may be between −2° and +2°. The stacking angle is defined as the angle between the chord of each blade profile and the circumferential direction. The nominal stacking angle may be the stacking angle of the internal blade profile and thus describe the angle between the chord of the internal blade profile and the circumferential direction. By way of example, the stacking angle variation values may be −2.0°, −1.9°, −1.8°, −1.7°, −1.6°, −1.5°, −1.4°, −1.3°, −1.2°, −1.1°, −1.0°, −0.9°, −0.8°, −0.7°, −0.6°, −0.5°, −0.4°, −0.3°, −0.2°, −0.1°, 0.0°, 0.1°, 0.2°, 0.3°, 0.4°, 0.5°, 0.6°, 0.7°, 0.8°, 0.9°, 1.0°, 1.1°, 1.2°, 1.3°, 1.4°, 1.5°, 1.6°, 1.7°, 1.8°, 1.9°, or 2.0°.

Since it cannot always be guaranteed that a compressive stress will be generated as the major principal stress in terms of magnitude during operation, in a preferred development the adjustment of the threading strategy may also be used to positively influence the ratio of the leading-edge stress to the average stress in individual profile sections of the blade. In this context, a stress ratio of $\theta_{ratio}\sigma_{1,LE}/\sigma_{ave} \leq 0.5$ over the lower 90% of the radial blade extension is desired as the target value for an FOD/DOD-resistant design. Besides the adjustment to the threading strategy, this target value can also be achieved by way of a relative change to the stacking angles of profile sections arranged near one another.

A second aspect of the present disclosure relates to a turbomachine, in particular an aircraft engine, having at least one blade from the first aspect.

Other features and their advantages can be taken from the descriptions of the first aspect.

Other features of the present disclosure will become apparent from the claims, the drawings, and the description of the drawings. The features and feature combinations mentioned above in the description, and the features and feature combinations mentioned below in the description of the drawings and/or shown in isolation in the drawings can be used not only in the specified combination but also in other combinations, without departing from the scope of the present disclosure. The present disclosure should thus be considered to include and disclose embodiments that are not explicitly shown in the drawings or explained but which arise from and can be produced as a result of separate feature combinations out of the embodiments that are described. Embodiments and feature combinations that consequently do not contain all the features of an original independent claim should also be deemed disclosed. In addition, the present disclosure should be deemed to disclose embodiments and feature combinations, in particular those resulting from the above-described embodiments, that either go beyond or deviate from the feature combinations set forth in the back-references of the claims.

FIG. 1 is a schematic illustration of a course of a reference line in a blade. In particular, the blade 1 may be a rotor blade 1 for a turbomachine 2, in particular for an aircraft engine. The coordinate system 3 may be defined in cylinder coordinates based on a rotor shaft 4. An axial direction x may be oriented in parallel with a longitudinal direction of the rotor shaft 4. A radial direction r may be oriented radially starting from a center of the rotor shaft 4. A tangential direction t may be oriented in a circumferential direction around the rotor shaft 4. The blade 1 may be secured to the rotor shaft 4. The blade 1 may be intended to be arranged radially on the rotor shaft 4. A jet deflection portion 6 may adjoin an internal blade profile 5 in the radial direction and may extend as far as a tip of the blade 1 at a radial outer end of the blade 1. The blade 1 may have blade profiles 7 in the jet deflection portion 6, and these may be arranged in respective tangential planes in relation to the rotor shaft 4 at predetermined radial distances from the internal blade profile 5. The blade profiles 7 may have respective centers of mass 8, which may be arranged along a linearly and radially running reference line 9. The blade profiles 7 may have different shapes from one another. The blade 1 may have a leading edge 11 and a trailing edge 10. The leading edge 11 may be defined in relation to a flow direction such that the gas may impact on the leading edge 11 during operation of the turbomachine 2. Since the blade 1 is designed for operational efficiency, a distribution of stresses at the leading edge 11 may be positive during operation, as a result of which damage may occur and cracks may propagate in particular at the leading edge 11 in the event of a foreign object strike.

A circumferential and axial position of the blade center of gravity 8 in the hub section is determined by the reference line 9, with a purely radial threading of all the other blade profiles 7 being provided. The centers of gravity 8 are arranged on the reference line 9. In FIG. 1, a reference configuration is defined for the adjustment.

Figure 2:
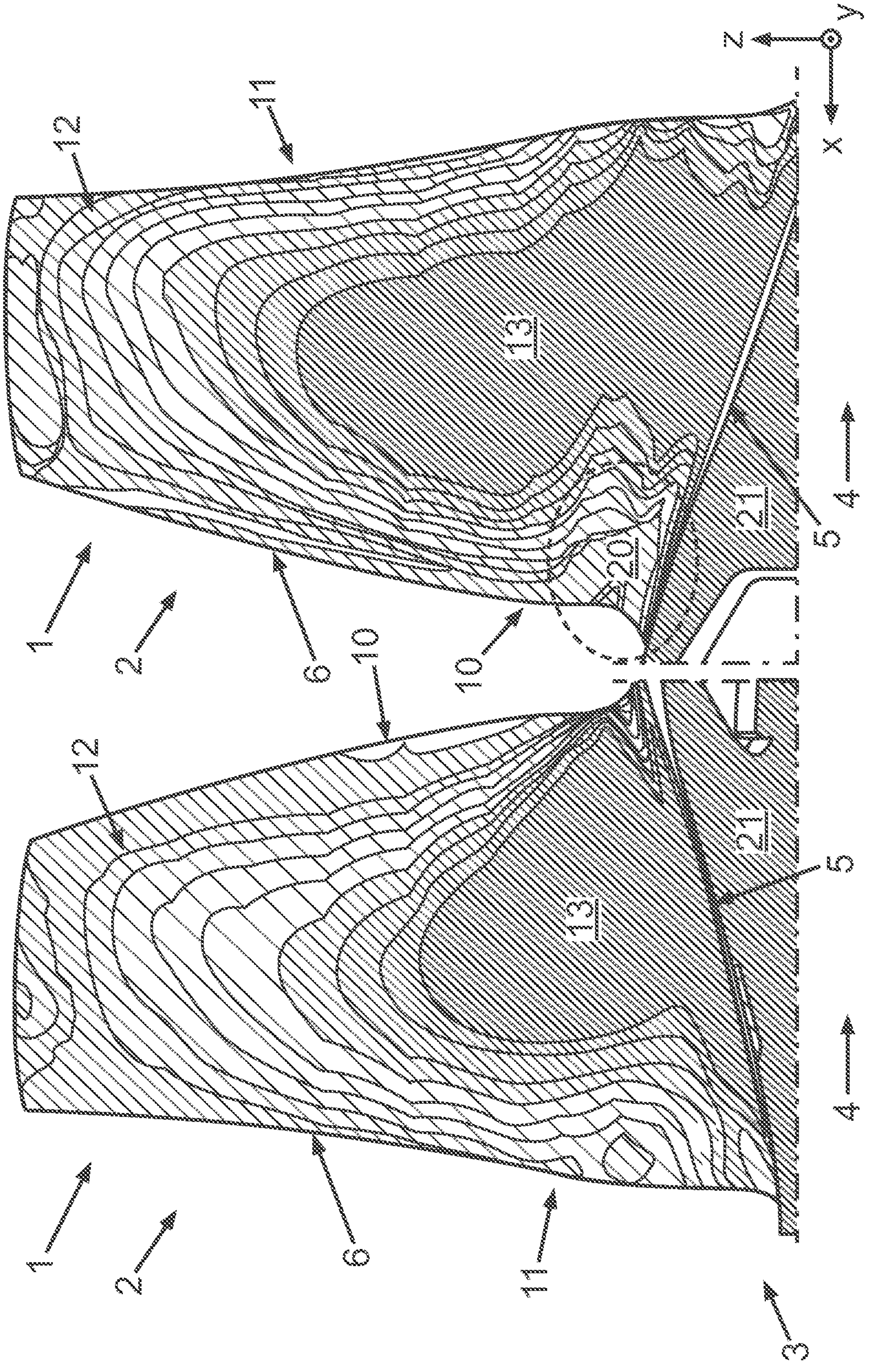
FIG. 2 is a schematic illustration of a distribution of stresses in the blade shown in FIG. 1.

FIG. 2 is a schematic illustration of a distribution of stresses in the blade 1 shown in FIG. 1. The figure shows a distribution of a magnitude of a major principal stress 12 during operation of the blade 1 in the turbomachine 2 at a predetermined working point. It can be seen that the highest magnitude of the principal stress 12 is in an inner region 13 of the blade 1; this stress may be a tensile stress. Apart from one trailing-edge region 20 of the trailing edge 10, a tensile stress dominates in the blade 1. The trailing-edge region 20 of the trailing edge 10 has a compressive stress that is negative. As a result of the negative stress, the blade 1 is less prone to cracks propagating in the trailing-edge region 20. Cracks may propagate, for example, due to foreign object strikes. It would thus be advantageous if the leading edge 11 of the blade 1—which is at risk from foreign objects—had a compressive stress over the entire length of the jet deflection portion 6 or at least a part-length 15 of 90% of the length of the jet deflection portion 6, starting from the internal blade profile 5.

Figure 3:
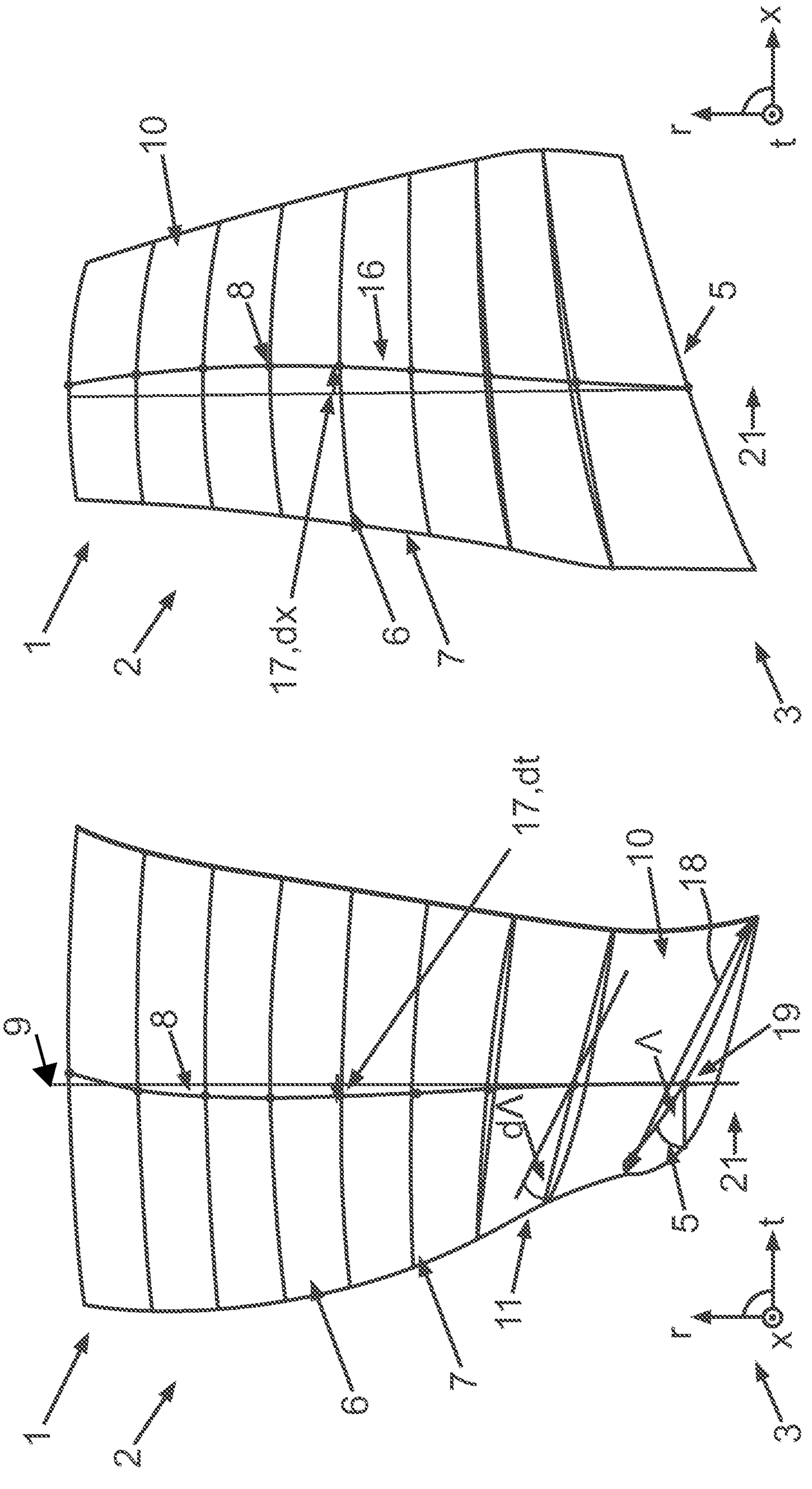
FIG. 3 is a schematic illustration of a blade.

FIG. 3 is a schematic illustration of a blade 1. The figure shows a blade 1 that has been altered compared with blade 1 shown in FIG. 1 by varying the positions of the centers of gravity 8 in order to provide a negative principal stress 12 at a leading edge 11 of the blade 1. To provide the compressive stress as the principal stress 12 at the leading edge 11, the position of the blade profiles 7 may be varied, in which case the centers of gravity 8 of the blade profiles 7 may be offset from the linear, radially running reference line 9. The displacements may be carried out in the tangential direction t and/or the axial direction x. Owing to the displacements, the centers of gravity 8 may be displaced in relation to the reference line 9 in an axial direction x by respective axial variation values dx and/or in a tangential direction t by respective tangential variation values dt. The individual centers of gravity 8 may be joined by a thread line 16, which thus may be different from the reference line 9. A course of the thread line 16 may be described by a polynomial of the nth order, where n may be a natural number greater than 1. The thread line 16 may describe a total deviation 17 of the centers of gravity 8 at a respective radial distance on the basis of the radial distance of the center of gravity 8 from the internal blade profile 5. The respective tangential variation values dt may be in a range between −5° and 5°, in particular in a range between −2.5° and 2.5°. In other words, each center of gravity 8 may be displaced in the tangential direction in relation to the reference line 9 by between −5° and +5°, in particular by between −2.5° and +2.5°. For the axial variation values dx, the magnitudes of the respective axial variation values dx may be at most 20%, in particular at most 10%, of a respective length of a chord 18 of the relevant blade profile. The chord 18 of each blade profile 7 may join a profile lug of the blade profile 7 to a profile trailing edge of the blade profile 7. In other words, the axial variation dx is no more than 20% of the length of the respective chord 18 of each blade profile 7. The reference line 9 and the thread line 16 may run at least through a first of the centers of gravity 8, which may be the center of gravity 8 of the internal blade profile 5. The center of gravity 8 of the internal blade profile 5 may thus be a joint origin 19 of the reference line 9 and the thread line 16. Each blade profile 7 may have a respective stacking angle describing an angle between the chord 18 of that blade profile 7 and the circumferential direction t. The stacking angles may differ from a nominal stacking angle Λ by stacking angle variation values dΛ; the nominal stacking angle may describe an angle between the chord 18 of the internal blade profile 5 and the circumferential direction t. In other words, the stacking angles of at least some of the blade profiles 7 may deviate from the nominal stacking angle Λ by respective stacking angle variation values dΛ. For a stacking angle variation value dΛ of 0°, the chord 18 of the respective blade profile 7 is oriented in parallel with the chord 18 of the internal blade profile 5.

The stacking angles of at least some of the blade profiles 7 may deviate from the nominal stacking angle Λ by the respective stacking angle variation values dΛ, the respective stacking angle variation values dΛ being at most 2°. In other words, the respective stacking angles differ from the nominal stacking angle by at most 2°. The stacking angle variation values may be between −2° and +2°.

The threading strategy of the centers of gravity 8 of the profile sections or blade profiles 7 is thus adjusted in the axial direction x and the circumferential direction t such that the major principal stress 12 in terms of magnitude in the critical profile region 13—the blade leading edge 11—is a compressive stress. In addition, the stacking angle of at least some of the blade profiles 7 may be varied by the respective stacking angle variation values dΛ.

The adjustment of the threading, predetermined by the thread line 16 relative to the reference configuration, involves optimizing the threading course (polynomial of the nth order) with a view to influencing the stress at the leading edge. A parameter range of the displacement of the center of gravity of the blade profiles 7 may be predetermined by a maximum circumferential variation dt of +/−5° and/or by a maximum axial variation dx of +/−20% of the chord length of the relevant blade profile 7.

Figure 4:
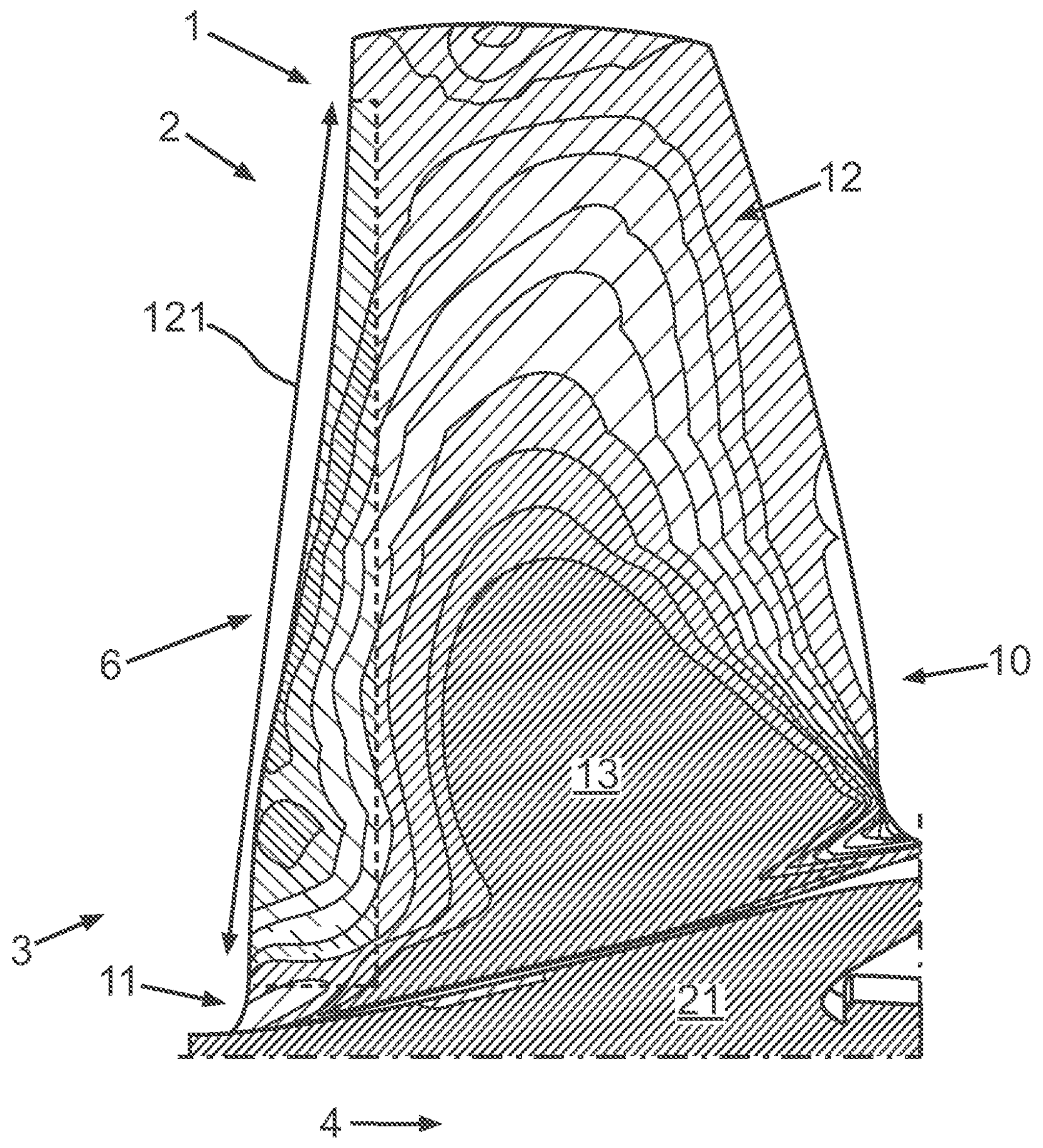
FIG. 4 is a schematic illustration of a distribution of stresses in the blade shown in FIG. 3.

FIG. 4 is a schematic illustration of a distribution of stresses in the blade shown in FIG. 3. It can be seen that the leading-edge region 14 of the leading edge has a negative stress. In this region, a compressive stress is the local principal stress. This leads to the advantage whereby the leading edge is more resistant to foreign object strikes than the blade shown in FIG. 1.

Currently, compressor blades are predominantly designed, on an interdisciplinary basis, with a focus on maximizing the efficiency and the surge margin while adhering to the structural and mechanical strength requirements (load factor<60% Goodman relation).

Geometries resulting from this approach often have regions that are sensitive to foreign object damage (FOD) or domestic object damage (DOD). During operation of the components, damage occurs more frequently in particular at the blade leading edges. When damaged, said the regions restrict the further operation of the engine and make it necessary to carry out extraordinary maintenance on the affected components.

During the interdisciplinary design process for compressor blades, the distribution of stresses in critical component regions may be influenced in a targeted manner. To make the region of the blade leading edge—a region often affected by damage—more robust, it is proposed to adjust the previously used threading strategy of the individual blade profile sections. The aim of this adjusted threading strategy (position of the center of gravity of the individual blade profiles adjusted axially and in the circumferential direction) is to load the blade leading edge in the working region such that the major principal stress in terms of magnitude in the critical profile region is a compressive stress. This kind of stress field counteracts the rapid propagation of cracks into the component and is thus a way of increasing the robustness of the blade to damage.

Since it cannot always be guaranteed that a compressive stress will be generated as the major principal stress in terms of magnitude during operation, the adjustment of the thread line is also to be used to positively influence the ratio of the leading-edge stress to the average stress in individual blade profiles of the blade. In this context, a stress ratio of $\theta_{ratio}=\sigma_{1,LE}/\sigma_{ave}\leq 0.5$ over the lower 90% of the radial blade extension is desired as the target value for an FOD/DOD-resistant design. Besides the adjustment to the threading strategy, this target value can also be achieved by way of a relative change to the stacking angles of blade profiles arranged near one another.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Blade
2 Turbomachine
3 Coordinate system
4 Rotor shaft
5 Internal blade profile
6 Jet deflection portion
7 Blade profile
8 Center of gravity
9 Reference line
10 Trailing edge
11 Leading edge
12 Principal stress
13 Region
14 Leading-edge region
15 Part-length
16 Thread line
17 Total deviation
18 Chord
19 Origin
20 Trailing-edge region
21 Blade root element
t Tangential direction
dt Tangential variation value
r Radial direction
x Axial direction
dx Axial variation value
Λ Nominal stacking angle
dΛ Stacking angle variation

The invention claimed is:

1. A blade for a turbomachine, the blade comprising:
an internal blade profile; and
a jet deflection portion, which adjoins the internal blade profile in a radial direction in relation to a rotor shaft,
wherein the jet deflection portion comprises a plurality of blade profiles that each have a respective center of gravity in a normal orientation in relation to the radial direction,
wherein:
a) the respective center of gravity of each of the blade profiles of the jet deflection portion is displaced in parallel with the rotor shaft in an axial direction by a respective one of axial variation values and in relation to a reference line, which is running linearly in the radial direction, through a center of gravity of the internal blade profile, and perpendicular to the axial direction,
and/or
b) the respective center of gravity of each of the blade profiles of the jet deflection portion is displaced in a tangential direction by respective one of tangential variation values in relation to the reference line, which is running linearly in the radial direction, through the center of gravity of the internal blade profile, and perpendicular to the axial direction,
wherein the respective centers of gravity are joined by a thread line starting from the internal blade profile,
wherein the thread line is a curved line,
wherein a maximum of the curved form of the thread line is displaced axially rearward with respect to the reference line, and
wherein at least over a lower 90% of the radial blade extension the thread line is displaced axially rearward respect to the reference line, and,
wherein the thread line is selected and designed such that a compressive stress is produced in the region of the leading edge of the blade during operation.

2. The blade according to claim 1,
wherein the blade is formed as a rotor blade.

3. The blade according to claim 1,
wherein respective stacking angles of at least some of the blade profiles deviate from a nominal stacking angle of the internal blade profile.

4. The blade according to claim 1, wherein the respective center of gravity of each of the blade profiles of the jet deflection portion is displaced in the axial direction in relation to the reference line running linearly in the radial direction.

5. The blade according to claim 1, wherein all maxima of the thread line are displaced axially rearward with respect to the reference line.

* * * * *